United States Patent
Yamashita et al.

(10) Patent No.: US 12,182,993 B2
(45) Date of Patent: Dec. 31, 2024

(54) VISUAL INSPECTION APPARATUS AND VISUAL INSPECTION METHODS

(71) Applicant: RENESAS ELECTRONICS CORPORATION, Tokyo (JP)

(72) Inventors: Hiroshi Yamashita, Tokyo (JP); Masahiro Ibe, Tokyo (JP); Kojiro Tanimura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 18/311,540

(22) Filed: May 3, 2023

(65) Prior Publication Data

US 2024/0013370 A1 Jan. 11, 2024

(30) Foreign Application Priority Data

Jul. 5, 2022 (JP) ................................ 2022-108707

(51) Int. Cl.
*G06T 7/00* (2017.01)
*H04N 23/56* (2023.01)

(52) U.S. Cl.
CPC ............. *G06T 7/001* (2013.01); *H04N 23/56* (2023.01); *G06T 2207/30148* (2013.01)

(58) Field of Classification Search
CPC ................ G01N 21/88; G01N 21/8803; G06T 2207/301; G06T 2207/30108; G06T 2207/30168; G06T 2207/20164; G06T 2207/0152; G06T 7/001; H04N 23/56
See application file for complete search history.

(56) References Cited

U.S. PATENT DOCUMENTS

| | | | |
|---|---|---|---|
| 8,519,529 B2 | 8/2013 | Ogihara | |
| 10,794,840 B2 * | 10/2020 | Zhang | ..................... G06T 7/001 |
| 10,803,572 B2 * | 10/2020 | Umehara | .............. G06T 7/0004 |
| 11,226,195 B1 * | 1/2022 | Pankonien | ............. H04N 23/90 |
| 11,244,842 B2 * | 2/2022 | Yamashita | .............. G06T 7/001 |
| 2002/0036512 A1 * | 3/2002 | Maeda | .................. G06T 7/0004 356/237.4 |
| 2005/0277268 A1 * | 12/2005 | Hoshika | ............. H01L 31/0203 438/457 |
| 2017/0242955 A1 * | 8/2017 | Ono | ...................... G06F 30/398 |
| 2018/0213134 A1 * | 7/2018 | Wu | ........................ H04N 23/56 |

(Continued)

FOREIGN PATENT DOCUMENTS

JP 2011-146415 A 7/2011

*Primary Examiner* — Brian P Yenke
(74) *Attorney, Agent, or Firm* — Rimon P.C.

(57) ABSTRACT

A visual inspection apparatus includes a stage on which a FCBGA type semiconductor package having a lid is placed, a camera located above the stage, a coaxial illumination device located between the camera and the stage, an oblique illumination device located between the camera and the stage, and a control device. The control device is configured to irradiate the FCBGA type semiconductor package with illumination lights by the coaxial illumination device and the oblique illumination device, capture the FCBGA type semiconductor package by the camera to obtain the captured image, integrate a number of pixels of a predetermined pixel value by a binarization process of the captured image to obtain a determination value, and compare the determination value with a predetermined value to determine a non-defective product or a defective product.

14 Claims, 6 Drawing Sheets

(56) References Cited

U.S. PATENT DOCUMENTS

| | | | |
|---|---|---|---|
| 2021/0398261 A1* | 12/2021 | Varkey | G06T 5/50 |
| 2022/0072791 A1* | 3/2022 | Tastl | G06T 7/80 |
| 2023/0342909 A1* | 10/2023 | Hyatt | H04N 23/74 |
| 2024/0046446 A1* | 2/2024 | Vukovic | H04N 23/60 |
| 2024/0071795 A1* | 2/2024 | Iinuma | G06T 7/0004 |

* cited by examiner

VISUAL INSPECTION APPARATUS AND VISUAL INSPECTION METHODS

CROSS-REFERENCE TO RELATED APPLICATIONS

The disclosure of Japanese Patent Application No. 2022-108707 filed on Jul. 5, 2022, including the specification, drawings and abstract is incorporated herein by reference in its entirety.

BACKGROUND

The present disclosure relates to a visual inspection apparatus, and is applicable to, for example, a visual inspection apparatus of a semiconductor package having a lid.

In a FCBGA (Flip Chip Ball Grid Array) type semiconductor package, a semiconductor chip mounted on a wiring board is covered with a cover called the lid, and the semiconductor chip and the lid are in contact with each other via a heat dissipation paste or the like. And it has a function as a heat dissipation plate (for example, Japanese Patent Laid-Open No. JP-A-2011-146415).

SUMMARY

For example, after the FCBGA type semiconductor package is completed, the FCBGA type semiconductor package may be pressed in an inspection process. At this time, a lid deformation may occur.

Other objects and novel features will become apparent from the description of this specification and the accompanying drawings.

An outline of representative ones of the present disclosure will be briefly described below. That is, the visual inspection apparatus includes a stage on which the FCBGA type semiconductor package (semiconductor device) having the lid is mounted, a coaxial illumination device and an oblique illumination device irradiated with illumination lights from above to the FCBGA type semiconductor package, a camera which takes a captured image of the FCBGA type semiconductor package irradiated with the illumination lights by the coaxial illumination device and the oblique illumination device, and a control device. Here, the coaxial illumination device and the oblique illumination device are located between the stage and the camera. The control device converts the captured image into a binary image, calculates a judgment value by integrating a number of pixels of a predetermined pixel value of the binary image, and judges a pass or rejection of the inspection target by comparison the judgment value and a predetermined value.

According to the present disclosure, it is possible to inspect the lid deformation.

DETAILED DESCRIPTION

Embodiments will be described below with reference to the drawings. However, in the following description, the same components are denoted by the same reference numerals, and a repetitive description thereof may be omitted. It should be noted that, for clarity of explanation, the drawings may be represented in an equation manner with respect to width, thickness, shapes, and the like of the respective portions as compared with the actual embodiments. Also, the dimensional relationships of the respective elements, the ratios of the respective elements, and the like do not necessarily coincide with each other in the plurality of drawings.

Figure 1:
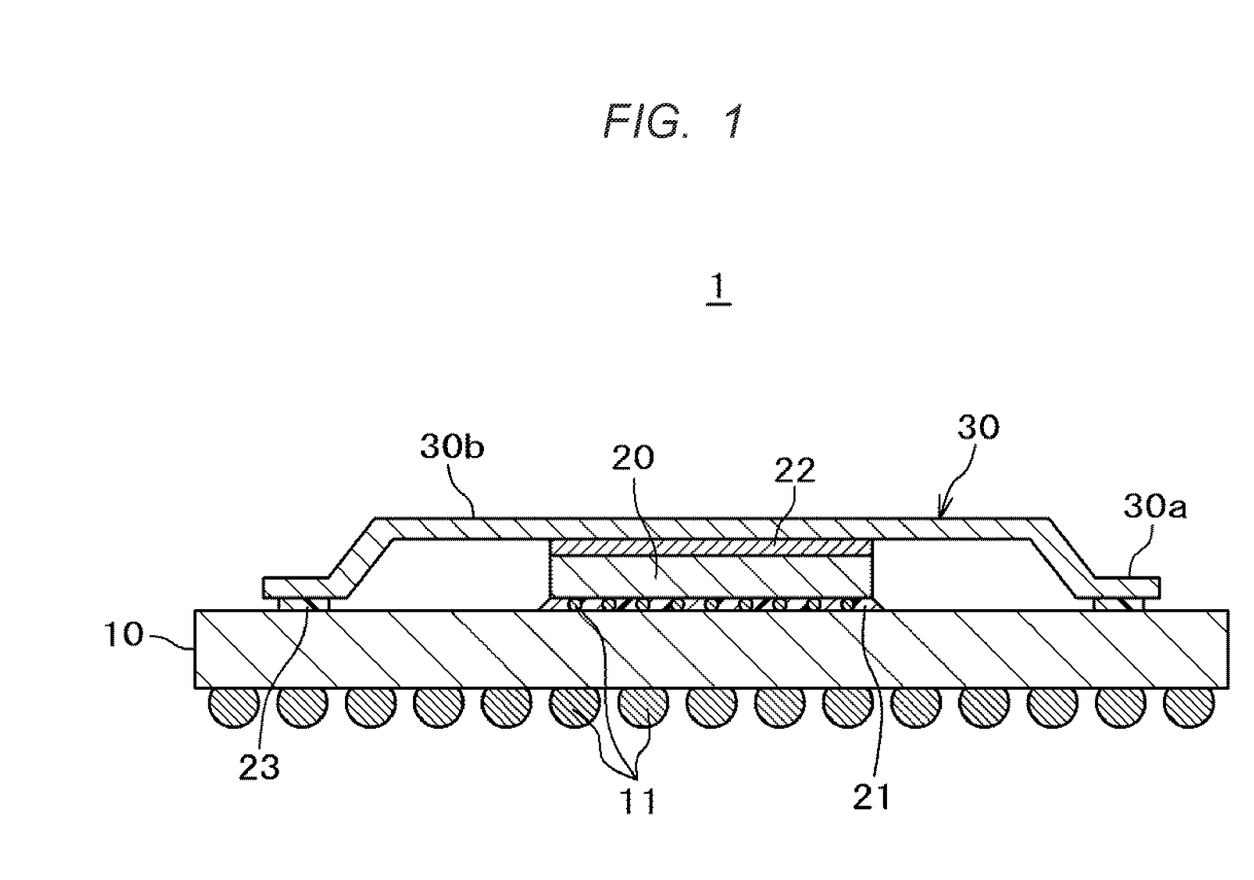
FIG. 1 is a cross-sectional view schematically showing a structure of a FCBGA type semiconductor package.

First, a structure of an inspection target that is a structure of a FCBGA type semiconductor package (semiconductor device) having a lid will be described with reference to FIG. 1. FIG. 1 is a cross-sectional view schematically showing a structure of the FCBGA type semiconductor package.

In the FCBGA type semiconductor package 1, a semiconductor chip 20 is covered by a cover called the lid 30. The lid 30 is made of a highly thermally conductive metal material such as copper. The lid 30 is adhered to the semiconductor chip 20 at a top 30b. In addition, the lid 30 is adhered to a wiring substrate 10 only by an edge 30a. The edge 30a of the lid 30 is an outer frame part (flanged) which is in contact with the wiring substrate 10. In order to make the lid 30 function as a heat sink, for example, after an underfill (UF) resin 21 is cured, a heat dissipation paste 22 is applied to a bottom surface of the semiconductor chip 20. The lid 30 is adhered to the wiring substrate 10 in the following manner, for example. An adhesive (lid adhesive resin) 23 is linearly applied on the wiring substrate 10, the edge 30a of the lid 30 is adhered to a portion to which the adhesive 23 is applied, the lid 30 is adhered, and the adhesive 23 is cured.

Figure 2:
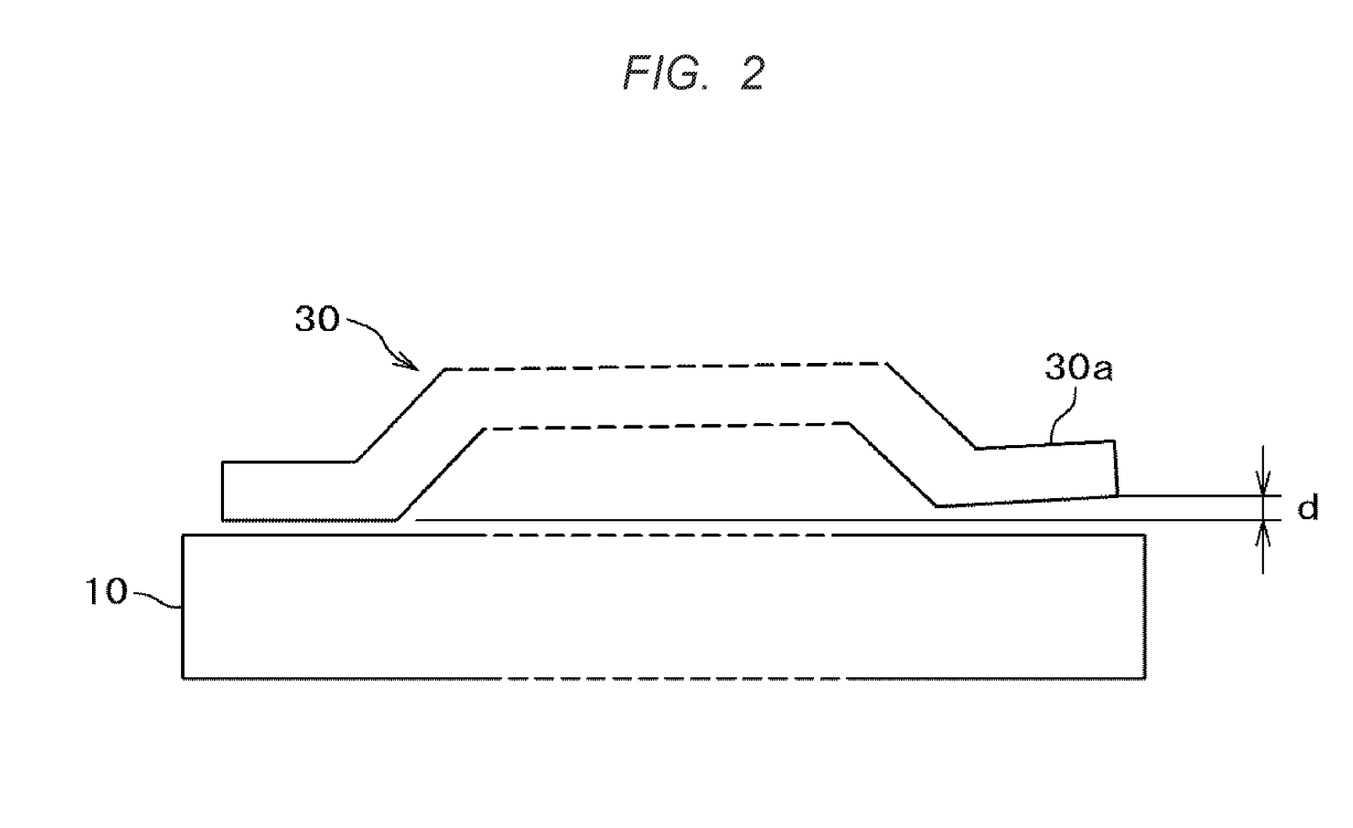
FIG. 2 is a view showing a modification of a lid shown in FIG. 1.

Next, problems of the FCBGA type semiconductor package 1 will be described with reference to FIG. 2. FIG. 2 is a view showing a modification of the lid 30 shown in FIG. 1.

In an inspection process after completion of the FCBGA type semiconductor package 1 as shown in FIG. 1, for example, in a screening test of a non-defective/defective product, the lid deformation may occur as shown in FIG. 2. Specifically, when a product misalignment occurs in a measuring unit such as a socket on which the FCBGA type semiconductor package 1 is placed in a screening test device, the lid 30 on an upper surface of the FCBGA type semiconductor package 1 may be held down by a measuring handler or a like that conveys the FCBGA type semiconductor package 1. At this time, the lid deformation may occur. This lid deformation may cause the edge 30a of the lid 30 to be displaced from the wiring substrate 10 to a predetermined height or more. In this case, it is assumed that a deformation amount (d) is a distance between the bottom surface to which the edge 30a of the lid 30 is normally fixed and a bottom surface end portion where the edge 30a of the lid 30 is raised due to deformation.

Figure 3:
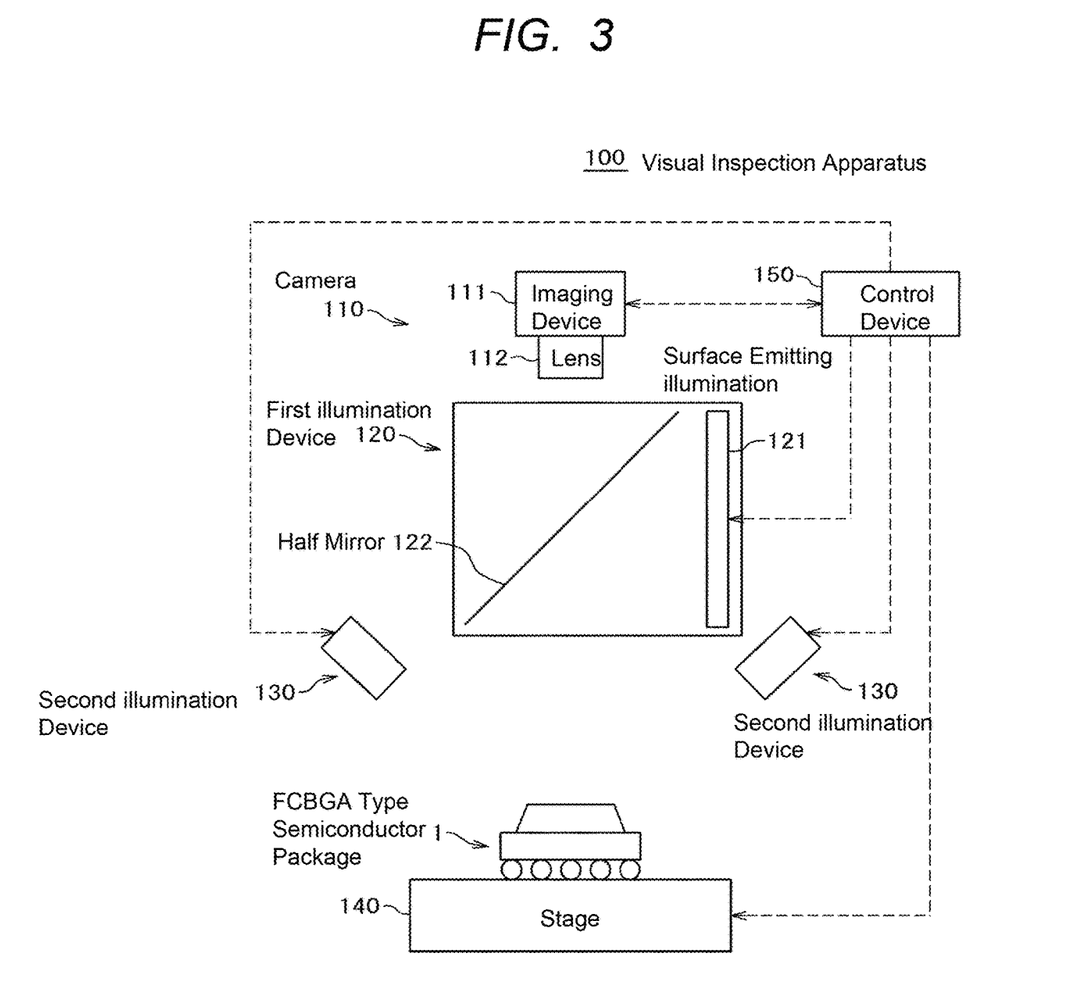
FIG. 3 is a diagram showing a schematic configuration of a visual inspection apparatus according to the embodiment.

Next, the visual inspection apparatus capable of inspecting the lid deformation described above will be described with reference to FIG. 3. FIG. 3 is a diagram showing a schematic configuration of a visual inspection apparatus according to the embodiment.

The visual inspection apparatus 100 includes the camera 110, a first illumination device 120, a second illumination device 130, the stage 140, and the control device 150. The camera 110 is located, for example, directly above the stage 140 and is located with a viewing angle oriented perpendicular downward. The camera 110 is located so that the FCBGA type semiconductor package 1 is located in the field of view. The first illumination device 120 and the second illumination device 130 irradiate illumination lights in order to make a brightness of the FCBGA type semiconductor package 1 placed on the stage 140 capable of being photographed by the camera 110. With this configuration, the camera 110 can photograph the upper surface of the FCBGA type semiconductor package 1. That is, the camera 110 can take an image of an appearance of the FCBGA type semiconductor package 1. The camera 110 comprises an imaging device 111 and an lens 112. The camera 110 digitizes the brightness (light intensity).

The first illumination device 120 is located between the camera 110 and the stage 140. The first illumination device 120 includes a surface emitting illumination (light source) 121 and a half mirror (semi-transmissive mirror) 122. The illumination light from the surface emitting illumination 121 is reflected by the half mirror 122 on a same optical axis as that of the camera 110, and is irradiated onto the FCBGA type semiconductor package 1 on the stage 140. A scattered light irradiated onto the imaging target with the same optical axis as that of the camera 110 is reflected by the FCBGA type semiconductor package 1, and the specular reflected light is transmitted through the half mirror 122 to reach the camera 110, thereby the captured image of the FCBGA type semiconductor package 1 is captured. The first illumination device 120 is a coaxial epi-illumination device (coaxial illumination device).

Note that a light source color of the surface emitting illumination 121 is a single color, for example, blue. In addition, it is preferable to use the light source capable of adjusting a power of the light source, and examples thereof include a device for adjusting an amount of the illumination light at a pulse dimming duty of LED (Light Emitting Diode). A luminance of the light source can be adjusted to 256 (0 to 255) gradations, for example.

The second illumination device 130 is located between the camera 110 and the stage 140. The second illumination device 130 is an oblique-bar illumination devise and is irradiated to the FCBGA type semiconductor package 1 on the stage 140 at a predetermined angle with respect to the optical axis of the camera 110. Four oblique-bar illuminations are provided so as to face four sides of the FCBGA type semiconductor package 1. The predetermined angle is, for example, 35 degrees to 45 degrees.

Note that a light source color of the second illumination device 130 is a monochrome, for example, a red color having a longer wavelength than the illumination light of the surface emitting illumination 121. It is preferable to use the light source capable of adjusting a power of the light source, and examples thereof include a device for adjusting an amount of the illumination light by the pulsed dimming duty of LED. A luminance of the light source can be adjusted to 256 (0 to 255) gradations, for example.

The control device 150 includes a central processing device (CPU), a storage device, and an input/output device. Image data captured by the camera 110 is stored in the storage device via an image capture device (capture board). The storage device is composed of a secondary storage device such as RAM (Random Access Memory) and HDD (Hard Disc Drive). The storage device stores program (software) for controlling the operations of the above-described units of the visual inspection apparatus 100, and data such as inspection thresholds to be described later. CPU executes the program stored in a main memory device. The input/output device includes a touch panel, a mouse, an image capture device (capture board), a monitor, a motor control device, and a I/O signal control device and so on.

CPU performs image processing on the stored image data. The CPU controls driving units such as the XY table of the stage 140, the first illumination device 120 and the second illumination device 130 via the I/O signal control device including the motor control device, a sensor, a switch control, and a like.

It is difficult to directly observe the lid deformation by photographing with the camera 110 from above the FCBGA type semiconductor package 1. Therefore, in the present embodiment, the lid deformation portion is shaded by an illumination beam from the first illumination device 120 and the second illumination device 130. The camera 110 photographs the FCBGA type semiconductor package 1 from above, and indirectly observes the lid deformation based on the brightness and darkness of the captured image of the FCBGA type semiconductor package 1.

When the surface of the lid 30 is, for example, nickel-plated and the brightness of the first illumination device 120 and the second illumination device 130 is high (illuminance of the surface of the lid 30 is high), the difference in brightness between a deformation portion of the edge 30a and the other portion is small even if the edge 30a of the lid 30 is deformed. Therefore, the brightness of the first illumination device 120 and the second illumination device 130 is adjusted so as to increase the brightness difference. It is preferable that the brightness of the first illumination device 120 that irradiate the illumination light directly above the FCBGA type semiconductor package 1 be relatively low. Since this illumination alone does not provide sufficient illuminance, it is preferable to make the brightness of the second illumination device 130 that obliquely irradiates the FCBGA type semiconductor package 1 slightly higher than the brightness of the first illumination device 120.

An exemplary setting of the first illumination device 120 and the second illumination device 130 is shown below. A luminance of the first illumination device 120: 5 to 10 (256 gradations). A luminance of the second illumination device 130: 15 to 20 (256 gradations). A luminance of the front face of the FCBGA type semiconductor package 1: 70 to 85 (1×). Here, "5 to 10" means "5 or more and 10 or less". The same applies to other numerical ranges.

Figure 4:
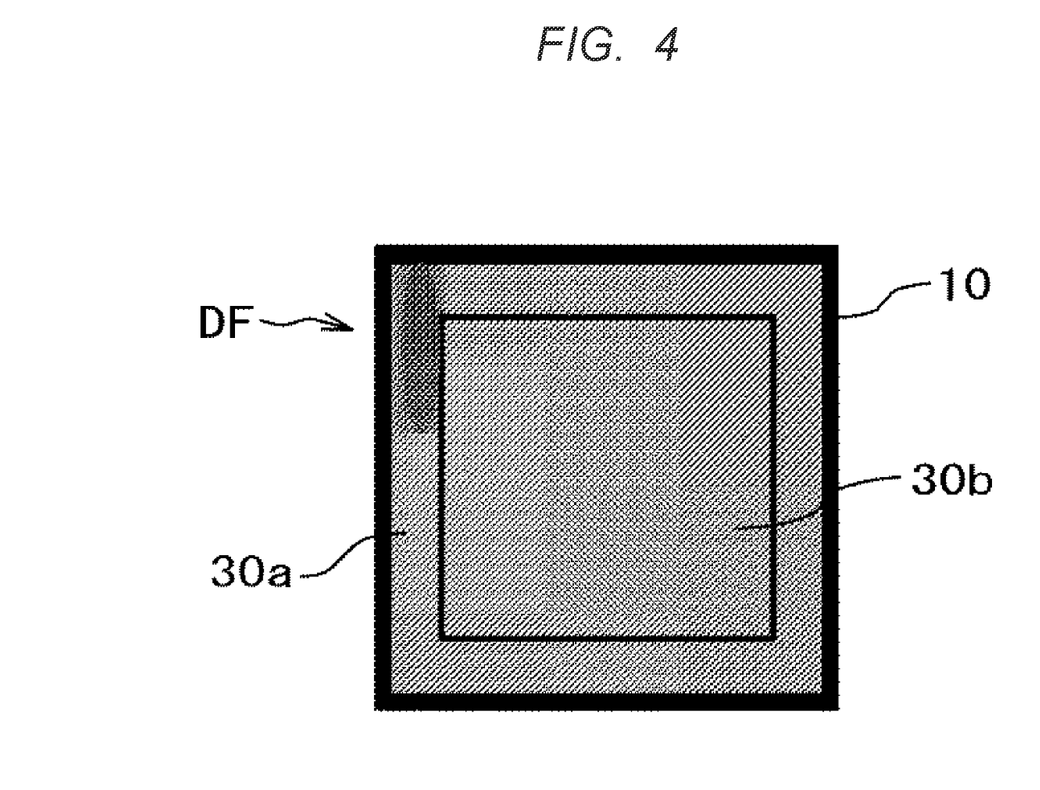
FIG. 4 is a diagram of a captured image of the FCBGA type semiconductor package having the lid deformation.
Figure 5:
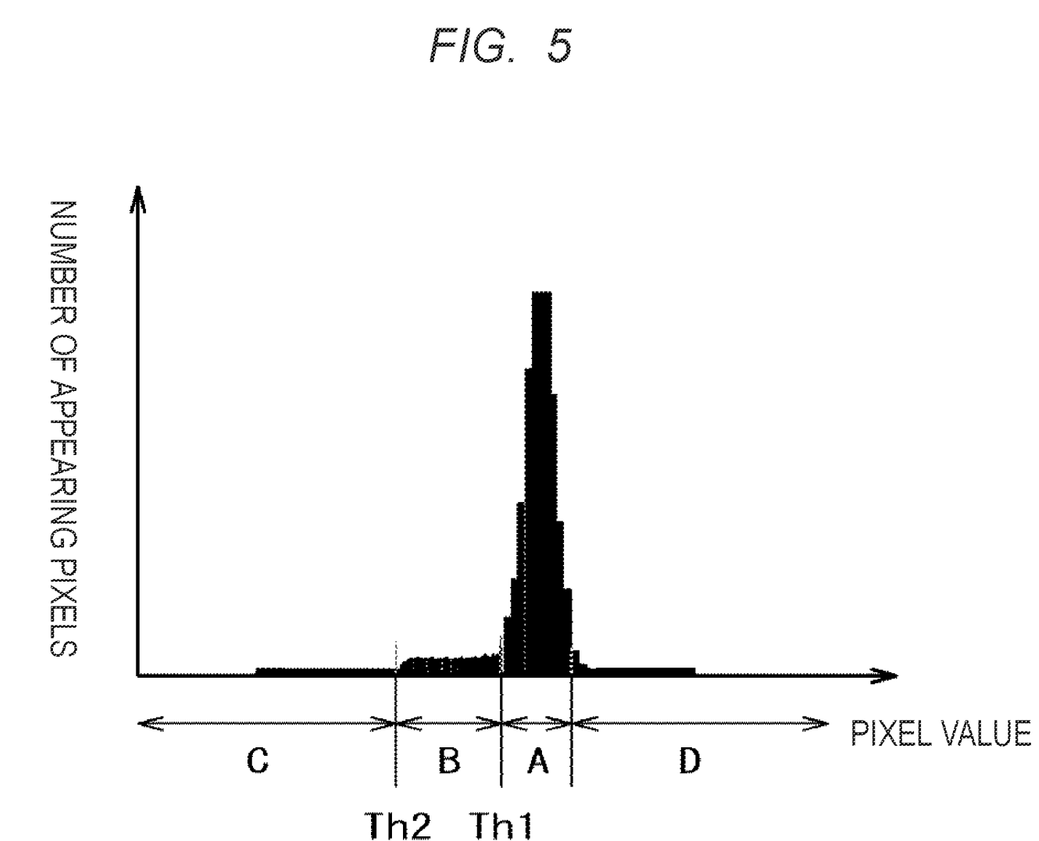
FIG. 5 is a diagram of a histogram of the captured image shown in FIG. 4.
Figure 6:
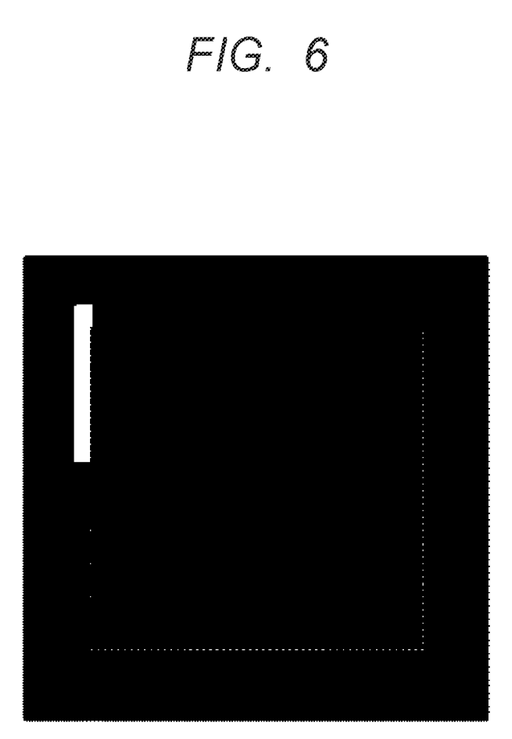
FIG. 6 is a diagram of an image obtained by binarizing the captured image shown in FIG. 4.

A method of detecting the lid deformation will be described with reference to FIG. 4 to FIG. 6. FIG. 4 is a diagram of the captured image of the FCBGA type semiconductor package 1 having the lid deformation. FIG. 5 is a diagram of a histogram of the captured image shown in FIG. 4. FIG. 6 is a diagram of the image obtained by binarizing the captured image shown in FIG. 4.

(Image Capture step) The control device 150 sets the first illumination device 120 and the second illumination device 130 to predetermined conditions, irradiates the first illumination device 120 and the second illumination device 130, and captures the FCBGA type semiconductor package 1 from above with the camera 110 to take the captured image. The captured image is, for example, 8-bit grayscale data (256 grayscales). In the captured image, as shown in FIG. 4, the upper surface of the deformed portion DF of the edge 30a of the lid 30 is darker than the undeformed portion.

(Binarization process step) The control device 150 performs a binarization process for the captured image captured by the camera 110 within a predetermined threshold range. The binarization process is performed by a histogram creation step, a thresholding step, and a binarization step.

(Histogram creation step) To set the thresholds, the control device 150 creates a histogram shown in FIG. 5. The horizontal axis represents a pixel value (a gradation indicating brightness, and the larger the value, the brighter), and a vertical axis represents a number of appearing pixels. The region (A) having a large number of appearing pixels is a portion of the lid 30 where there is no lid deformation. On the side where the pixel value is smaller than the region (A), there is a region (B) where a number of appearing pixels is slightly larger. The region (B) is a deformation portion of the lid 30. There is a region (C) in which the number of appearing pixels is smaller on a side where the pixel value is smaller than that of the region (B). In addition, there is a region (D) in which the number of appearing pixels is smaller on a side where the pixel value is larger than the region (A).

(Thresholding step) The control device 150 sets a first threshold value (Th1) at a boundary between the region (A) and the region (B), and sets a second threshold value (Th2) at a boundary between the region (B) and the region (C). Note that, by appropriately setting the first illumination device 120 and the second illumination device 130, the boundary between the region (A) and the region (B) and the boundary between the region (B) and the region (C) become clear, and the first threshold value (Th1) and the second threshold value (Th2) can be set.

(Binarization step) The control device 150 performs binarization in which pixels having the pixel value between the first threshold value (Th1) and the second threshold value (Th2) (region (B)) are set to "1" (white), and pixels in regions (region (C), region (A), and region (D)) having other pixel value is set to "0" (black). In other words, the control device 150 extracts a pixel in which the pixel value is within a predetermined range. By performing this binarization processing, the image as shown in FIG. 6 is obtained, and the deformation portion of the lid 30 becomes white.

(Blob Analysis) The control device 150 calculates a white area by integrating the white pixels of the image shown in FIG. 6. The calculated white area (the number of pixels) is used as the judgment value.

(Judgement process step) The control device 150 determines a defect when the judgment value exceeds a preset test threshold value. Here, the judgment value and the inspection threshold are the number of pixels, and the determination value is larger as the deformation amount of the lid deformation is larger.

A method of setting the inspection threshold will be described. The test threshold is determined in advance before the test. A number of samples of the same product with different deformation are prepared for each product. Here, the amount of deformation of each sample is measured and known. For example, a sample may be mounted on the stage of the visual inspection apparatus in the embodiment, and the distance difference between the upper surface of the wiring board 10 and the upper surface of the edge 30a of the ridge 30 may be measured.

The control device 150 performs the processing of the steps described above for each sample to obtain the respective judgment value and the deformation amount thereof. Based on the obtained relationship between the deformation amount and the judgment value, the control device 150 stores the determination value at which the deformation amount is equal to or greater than the predetermined value in the storage device of the control device 150 as the inspection threshold. These processes are performed for each product.

According to the present embodiment, it is possible to inspect the ridge deformation without using a three-dimensional inspection function such as a laser length measuring function or a phase shift length measuring projector. Further, by inspecting the ridge deformation, it is possible to reduce the shipment of defective products of the lid deformation.

While the disclosure made by the inventors of the present disclosure has been specifically described based on the embodiments, it is needless to say that the present disclosure is not limited to the above-described embodiments and can be variously modified.

What is claimed is:

1. A visual inspection apparatus comprising:
   a stage on which an inspection target to be mounted;
   a coaxial illumination device and an oblique illumination device irradiated with illumination lights from above to the inspection target;
   a camera which takes a captured image of the inspection target irradiated with the illumination lights by the coaxial illumination device and the oblique illumination device; and
   a control device, wherein
   the control device converts the captured image into a binary image,
   the control device calculates a judgment value by integrating a number of pixels of a predetermined pixel value of the binary image, and
   the control device judges non-defective product or defective product for the inspection target by comparison the judgment value and a predetermined value.

2. The visual inspection apparatus according to claim 1, wherein
   the coaxial illumination device and the oblique illumination device are located between the stage and the camera.

3. The visual inspection apparatus according to claim 1, wherein
   the inspection target is a FCBGA type semiconductor package having a lid, and
   the visual inspection apparatus is an apparatus for inspecting an appearance of the FCBGA type semiconductor package having the lid.

4. The visual inspection apparatus according to claim 2, wherein
   the predetermined value is obtained by inspecting another FCBGA type semiconductor package having another lid deformed to a known amount of deformation.

5. The visual inspection apparatus according to claim 2, wherein
   the illumination light of the coaxial illumination device is blue, and the illumination light of the oblique illumination device is red.

6. The visual inspection apparatus according to claim 2, wherein
   the control device sets a brightness of the coaxial illumination device and a brightness of the oblique illumination device so that a deformation of the lid can be detected.

7. The visual inspection apparatus according to claim 6, wherein
   the control device sets the brightness of the coaxial illumination device to be lower than the brightness of the oblique illumination device.

8. A method of a visual inspection comprising:
(a) mounting an inspection target on a stage;
(b) irradiating illumination lights by a coaxial illumination device and an oblique illumination device from above to the inspection target;
(c) taking a captured image of the inspection target illuminated with the illumination lights by the coaxial illumination device and the oblique illumination device by a camera;
(d) converting the captured image into a binary image on a control device;
(e) calculating a judgment value by integrating a number of pixels of a predetermined pixel value of the binary image on the control device; and
(f) judging non-defective product or defective product for the inspection target by comparison the judgment value and a predetermined value on the control device.

9. The method of the visual inspection according to claim 8, wherein
the coaxial illumination device and the oblique illumination device are located between the stage and the camera.

10. The method of the visual inspection according to claim 8, wherein
the inspection target is a FCBGA type semiconductor package having a lid.

11. The method of the visual inspection according to claim 10, wherein
the predetermined value is obtained by inspecting another FCBGA type semiconductor package having another lid deformed to a known amount of deformation.

12. The method of the visual inspection according to claim 8, wherein
the illumination light of the coaxial illumination device is blue, and the illumination light of the oblique illumination device is red.

13. The method of the visual inspection according to claim 8, wherein
the control device sets a brightness of the coaxial illumination device and a brightness of the oblique illumination device so as to detect a deformation of the lid.

14. The method of the visual inspection according to claim 13, wherein
the control device sets the brightness of the coaxial illumination device to be lower than the brightness of the oblique illumination device.

\* \* \* \* \*